Aug. 28, 1962 J. W. HUFFMAN 3,051,807
THERMORESPONSIVE SWITCH MECHANISM
Filed May 1, 1959
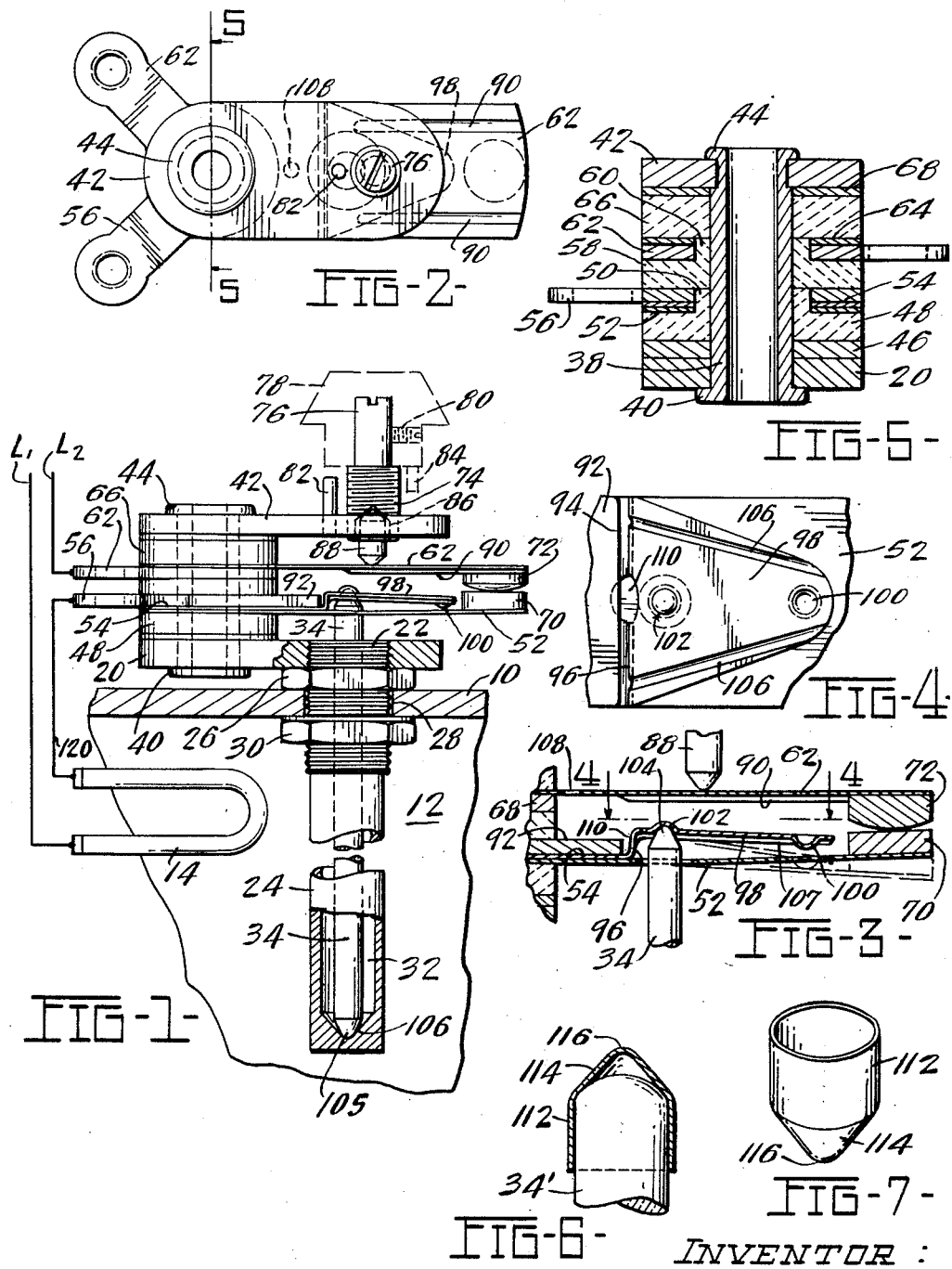
INVENTOR:
JOHN W. HUFFMAN.
BY
Harry O. Ernsberger
ATTY.

United States Patent Office 3,051,807
Patented Aug. 28, 1962

3,051,807
THERMORESPONSIVE SWITCH MECHANISM
John W. Huffman, Mansfield, Ohio, assignor to Pace, Inc., Mansfield, Ohio, a corporation of Ohio
Filed May 1, 1959, Ser. No. 810,286
6 Claims. (Cl. 200—137)

This invention relates to thermoresponsive circuit controlling switch mechanisms and more especially to manually adjustable switch mechanism embodying a thermoresponsive means for maintaining automatic control of an electric energizing circuit of an appliance, heating unit, cooling unit, or for exercising temperature control of a zone or region subject to variations in temperature.

Various types of thermoresponsive switch mechanisms have been used for controlling the circuits of electrically heated appliances, cooking utensils and the like and such thermoresponsive switch means have utilized bimetallic elements which are fixed in transverse directions under the influence of heat or temperature variations. In appliances of such character, the bimetallic means is usually spaced from the heated zone or region to be controlled, and a probe or probe bar disposed in the heated region utilized for conducting heat to a bimetallic element for influencing the position of the latter to actuate circuit controlling switch means.

In thermostart control mechanisms of this character, the probe bar is generally in substantial linear alignment with the bimetallic element necessitating a substantial distance of traverse of the heat conducted from the probe bar to the bimetallic element. Such constructions are not readily responsive to small temperature variations and appreciable time "lag" is inherent in such devices due to the period required for the conduction of heat to the bimetallic element. Furthermore heat losses are appreciable due to the distance traversed by the heat from the probe bar to the bimetallic or thermoresponsive element resulting in a substantial temperature spread between "on" and "off" conditions of the circuit and impairing accurate temperature control.

The present invention embraces the provision of a thermoresponsive switch means embodying a thermoresponsive element or component which, under the influence of temperature differentials, is expanded or contracted in a linear direction and the linear movement transmitted directly to a circuit controlling element whereby an accurate control of an energizing circuit may be reliably effected within extremely small temperature variations.

Another object of the invention resides in the provision of a thermoresponsive switch means embodying a linearly expansible thermoresponsive element or component wherein the circuit controlling means or movable switch contacts are directly responsive to the differential expansion or contraction of the thermoresponsive component disposed in the region in which the temperature is to be controlled.

Another object of the invention is the provision of a manually adjustable thermoresponsive switch means of the probe type embodying a linearly expansive thermoresponsive component associated with motion transmitting means wherein minute changes in the length of the thermoresponsive component are multiplied or amplified to control the position of a relatively movable contact member of the switch means whereby accurate control of an energizing circuit may be attained.

Another object of the invention is the provision of a thermoresponsive circuit controlling means embodying a heat responsive assembly comprising telescoped elements or components having differential coefficients of expansion whereby temperature variations set up substantial forces acting lengthwise of the elements which are transferred by motion multiplying means to circuit controlling elements without time delay whereby instantly responsive movements or cycling of the circuit controlling switch contacts may be obtained under the influence of minute temperature variations or deviations from a median temperature desired as predetermined by the manual adjustment of a component of the switch means.

A further object of the invention resides in the provision of a manually adjustable thermoresponsive switch means embodying a linearly expansible heat responsive means in conjunction with a lever arrangement whereby variations in temperature of the region to be controlled establishes a substantial force effective to complete or interrupt an energizing circuit whereby a simple yet effective mechanism is provided for positively and reliably controlling an energizing circuit with a minimum number of components or parts.

Still another object of the invention is the provision of a manually adjustable thermoresponsive switch means fabricated of a minimum number of parts or components whereby a compact and reliable thermoresponsive switch means may be produced at a greatly reduced cost as compared with the cost of prior devices.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view with certain parts illustrated in section showing a form of thermoresponsive switch means of the invention mounted with the thermoresponsive unit in a region the temperature of which is to be controlled;

FIGURE 2 is a top plan view of the thermoresponsive switch means illustrated in FIGURE 1;

FIGURE 3 is a longituidnal sectional detail view illustrating details of the switch mechanism;

FIGURE 4 is a plan view on the line 4—4 of FIGURE 3;

FIGURE 5 is an enlarged transverse sectional view taken substantially on the line 5—5 of FIGURE 2;

FIGURE 6 is a fragmentary detail view of a fitting usable with a component of the thermoresponsive means, and FIGURE 7 is an isometric view of the fitting illustrated in FIGURE 6.

While the switch mechanism embodying a thermoresponsive probe means is especially adaptable for controlling an energizing circuit of electrically heated appliances, such as fry pans, cookers or the like, it is to be understood that the thermoresponsive switch means may be employed for controlling an energizing circuit utilized for varying the temperature of any instrumentality or defined region subject to variable temperatures, as for example air flow tunnels, room heaters, dispensing machines for dispensing hot or cold liquids and wherever thermostatic control of an electric energizing circuit may be desirable or necessary.

Referring to the drawings in detail and initially to FIGURE 1, 10 designates a wall which, in the embodiment illustrated, provides a support for the thermoresponsive switch unit of the invention. The wall 10 may be a portion of an electrically heated appliance, a cooling or air conditioning unit or it may be a portion of a means defining a region 12 subject to temperature variations, the temperature of which may be controlled by the circuit controlling means of the invention.

As shown in FIGURE 1, the region 12 of the appliance or other unit to be controlled may be equipped with an electrically energizable heating element or component 14 where the region 12 is adapted to be maintained at a temperature above normal room temperature. If the region 12 is to be maintained at a reduced temperature below room temperature, the electrically energizing circuit controlled by the thermoresponsive switch means of the invention is connected with a refrigerating or cooling unit (not shown).

The thermoresponsive circuit controlling unit is inclusive of a frame structure, one component being a mounting plate or support 20 formed with a threaded bore to receive a threaded portion 22 of a tubular member, strut or component 24, the latter forming a linearly expansible component of the thermostat unit. The tube or strut member 24 is formed of a suitable metal of a character having a substantial coefficient of expansion and contraction under temperature variations, the relative linear movement thereof accompanying expansion or contraction being utilized for controlling an energizing circuit for the unit 14 in a manner hereinafter explained.

The strut member or component 24 extends into the region or chamber 12, the temperature of which is to be controlled by the arrangement of the invention. The threaded portion 22 of member 24 is adapted to receive a nut 26 for locking the member 24 to the mounting plate 20. Through the provision of the threaded connection and locking nut 26, the tube 24 may be adjusted relative to the mounting plate 20 by rotating the tube and, after the desired adjustment is obtained, member 24 may be locked to the mounting plate by tightening the locking nut 26.

The appliance wall 10 or other wall through which the tubular member 24 may extend is provided with a bore 28 to accommodate the tube 24. The tube 24 may be securely locked or held to the wall 10 by means of a securing nut 30 or the bore 28 threaded to receive the threaded portion 22. Disposed within the hollow interior or chamber 32 of the tubular strut member or component 24 is a rigid strut or rod 34 fashioned of a material dissimilar to that of the tube 24 and having a comparatively low coefficient of expansion or contraction so that the relatively substantial expansion or contraction of the metal tube 24 causes relative linear movement of the strut or rod 34.

The rod or strut 34 transmits the relative linear movement of expansion or contraction of the component 24 to the switch means for controlling an energizing circuit. The mounting plate 20 is formed with an opening to accommodate a tubular means or member 38 which also forms a component of the frame structure supporting components of the switch mechanism. The support member 38, which is of cylindrical or tubular shape, is arranged to provide a mounting means for the switch members and terminals or connectors which are arranged in stacked relation as shown in FIGURES 1 and 5.

The lower end of the tubular frame member 38 is formed with a laterally extending flange 40 which engages the mounting plate 20 as shown in FIGURE 5. The upper end region of the member 38 extends through an opening in a frame plate or member 42. After assembly of the components of the switch mechanism on the member 38 and the plate 42 is affixed in the position shown in FIGURES 1 and 5, the projecting end portion of member 38 is swaged as shown at 44 into engagement with the plate 42 to hold the components assembled on member 38 in fixed relation.

The tubular frame member 38 accommodates a spacer or disk-like washer 46 above which is positioned a circular member 48 of heat resistant insulating material such as lava or ceramic. The member 48 is provided with a tenon portion 50 upon which is assembled a flexible switch member or blade 52, an actuating member or means 54 for the switch member 52 and a terminal or connector member 56. As particularly shown in FIGURE 5, the metallic switch member 52, the metallic switch controlling means or member 54 and the terminal member 56 are in engaging current conducting relation.

Arranged above the terminal member 56 is a second insulating member 58 similar to member 48 formed of ceramic or other high temperature resistant insulating material. The member 58 is provided with a tenon 60 on which is assembled a second current conducting terminal 62 and a second flexible metal switch blade or member 64. Disposed above the second switch member 64 is a ceramic disk or washer 66 and a spacing washer 68, the latter being engaged by the frame plate 42.

The swaging of the member 38 as at 44 serves to hold the assembly of ceramic members, switch members and connector terminals in fixed assembled relation as illustrated in the drawings. As shown in FIGURE 1, the distal end of the first flexible switch member or blade 52 is provided with a contact 70 and the second switch member or blade 62 is provided at its distal end with a cooperating contact 72.

In the arrangement illustrated the switch blade 62 is adapted to be adjusted by manual means to a position corresponding to the temperature at which it is desired to control the region 12 of the appliance or other space. The plate 42 is provided with a threaded opening adapted to receive a threaded member 74, the member 74 being provided with a tenon 76 which accommodates a control knob or manipulating means 78. The manipulating means may be secured to the tenon 76 by means of a set screw 80 as shown in FIGURE 1.

The frame plate 40 supports a stop pin 82 and the manipulating knob 78 is provided with an abutment 84 which cooperates with the stop member 82 to limit the range of rotation of the threaded member 74.

The lower end region of the threaded member 74 is provided with a recess 86 accommodating a rigid strut or pin 88 formed of insulating material such as ceramic or lava, the lower end of the strut member 88 engaging the second switch member 62 as shown in FIGURE 1.

Through the medium of the threaded connection of member 44 with the frame plate 42, rotation of member 74 effects vertical movement of the strut 88 to adjust or change the position of the switch blade 62 and hence the position of the contact 72. The switch blade or member 62 is preferably fashioned with stiffening ribs 90 as shown in FIGURES 1, 2 and 3 so that flexure of the switch member or blade 62 takes place at a region adjacent its mounting by the ceramic members 58 and 66.

The rotation of the member 74 as restricted by the stop member 82 and the abutment 84 embraces the range of temperatures to be controlled by the thermoresponsive means. A scale (not shown) provided with temperature graduations may be utilized in connection with the manipulating means 78.

The member 54 provides means for transmitting linear expansion and contraction of the metal strut or member 24 to the first switch blade 52, actuating the latter in accordance with temperature variations or differentials in the region 12 to change the position of the contact 70 to complete or interrupt an energizing circuit. As particularly shown in FIGURES 1 and 3, the terminal member 56 is formed with a portion 92 extending in a right-hand direction, as viewed in FIGURES 1 and 3, a substantial distance from the periphery of the circular insulating members assembled on the tubular member 38.

The edge of projection 92 is of linear shape as shown at 94 and the projecting portion 92 forms a seat for that portion of the member 54 in contact therewith as shown in FIGURE 3. The member 54 is formed with an upwardly extending portion 96 disposed adjacent the linear edge 94 of member 92, the portion 96 being integrally joined with a portion 98 of member 54 which extends in a right-hand direction as viewed in FIGURES 1 and 3 in adjacent relation with the first switch member 52. The distal end of portion 98 is provided with a raised projection 100 which is adapted for engagement with the upper surface of the flexible switch member 52.

The portion 98 of member 54 adjacent the upwardly extending portion 96 is formed with a recess 102 to receive a rounded apex 104 at the upper end of the rod 34. As shown in FIGURE 1, the closed lower end region of the tubular member 24 is formed with a conically shaped socket 106 to receive a rounded apex 105 at the other end of rod 34. The bend in member 54 at the region of the upwardly extending portion 96 becomes the pivotal point of movement or fulcrum of the portion 98 of member 54 which, in effect, is a lever of the second order of levers. The distance from the portion 96 to the point of engagement of rod 34 with the portion 98 forming a power arm of the lever.

The distance between the point of engagement of rod 34 with member 98 and the point of engagement of the raised projection 100 with the switch member 52 being the load arm of the lever.

It will be seen from FIGURES 1 and 3 that the distance between the fulcrum portion 96 and the point of engagement of rod 34 with member 98 is but a fraction of the distance from the point of engagement of rod 34 with member 98 to the raised portion 100. Thus a minute linear change in the position of rod 34 is multiplied many times at the region of engagement of the raised projection 100 with the switch arm 52 so as to cause a substantial movement of contact member 70.

In the present embodiment the distances from the fulcrum provided by the bend at portion 96 of member 54 to the point of engagement of rod 34 with member 98 and the point of engagement of member 98 with the switch member 52 are in the ratio of about 1 to 8, but it is to be understood that these distances may be modified to secure any desired ratio of movement between the longitudinal axis of movement of the glass rod and the point of engagement of projection 100 with the flexible switch member 52.

The thermoresponsive component or tubular member 24 is preferably made of aluminum or aluminum alloy and the rod or strut 34 formed of stress-relieved glass. The member 24 has a coefficient of expansion substantially greater than that of the glass rod 34 so that variations in temperature in the region 12 cause expansion and contraction of the member 24 and effect little change in the length of the glass rod 34. Hence temperature variations in the space 12 affects the linear dimension of member 24 and such changes in linear dimension are directly transmitted by the glass rod 34 to the portion 98 of member 54 to effect substantial movement of the distal end region of the portion 98.

The member 54 and its portion 98 are fashioned or shaped initially so that the portion 98 is pre-stressed in a downward direction as viewed in FIGURES 1 and 3. Thus a downward movement of the glass rod 34 in a direction away from portion 98 results in engagement of the raised portion 100 with the switch arm 52, moving or flexing the latter downwardly to a broken line position indicated in FIGURE 3 with contact 70 out of engagement with the contact 72 to interrupt the circuit to the energizable unit 14.

Thus when the temperature of the region 12 is elevated to a predetermined value for which the member 74 may be manually adjusted, the expansion of the strut member or tubular member 24 moves the socket portion 106 thereof downwardly permitting downward linear movement of the rod 34 so that the raised portion 100 of member 98 engages the switch member 52 and interrupts the circuit at the desired temperature. After deenergization the unit 14 by disengagement of the contacts 70 and 72, the space 12, upon cooling, causes a shrinkage or contraction of the thermoresponsive component 24, effecting an upward linear movement of the glass rod 34 exerting upward thrust on the portion 98 and elevating the projection 100 out of engagement with the flexible switch blade 52.

The switch blade 52 is pre-stressed so as to be normally biased in an upward direction and carries the contact 70 into engagement with the contact 72 to reestablish the energizing circuit to the unit 14. In this manner the influence of temperature variations on the length of the thermoresponsive means 24 effects a precision control of the temperature as the extent of expansion and contraction of member 24 is multiplied many times in effecting corresponding movement of the end of member 98 and the switch member 52 so that a minute temperature variation in the region 12 is effective to engage or disengage the contact 70 with the contact 72.

This form of thermoresponsive means is highly efficient because the temperature ambient the member 24 is directly effective to control the switch member 52 without transmission of the heat from region 12 to a thermoresponsive means disposed in a remote position.

As particularly shown in FIGURES 3 and 4 the portion 98 of the member 54 is provided with reinforcing ridges 107 which extend from the upwardly extending portion 96 to the distal end of portion 98 so that portion 98 is substantially rigid. As shown in FIGURES 3 and 4, the upwardly extending portion 96 is provided with an opening 110 at its central region to reduce or weaken the transverse cross-sectional area of upwardly projecting portion 96 to provide a fulcrum or region about which flexure of portion 98 takes place adjacent the linear edge 94 of the projection 92. Through this construction the flexure or movement of member 98 will take place only at the fulcrum region provided at the bend in the portion 96 and longitudinal movement of the glass rod 34 is transmitted or communicated to the first switch member 52 without appreciable flexure of the body portion 98 of the motion transmitting means.

As will be seen in FIGURES 2 and 3, the second switch member 62 is provided at its central region with an opening 108 spaced slightly from the washer 68 so as to reduce or weaken the transverse cross-section of switch member 62 at this point in order to assure flexure of the switch member about a transverse line or axis through the opening 108.

This region of reduced cross-section forms a fulcrum or axis about which flexure of the member 62 takes place during adjustment of the switch member by manual rotation of the member 74. The switch mechanism may be enclosed in a suitable housing (not shown) preferably of insulating material such as molded resin with the manipulating knob 78 disposed exteriorly of the housing.

As shown in FIGURES 1 and 3, the end regions of the glass rod 34 are of cone-shaped configuration terminating in rounded extremities or apices which respectively engage in the socket 106 in the tubular strut 24 and in the recess provided at 102 in the portion 98 of member 54. In order to secure satisfactory and accurate operation of the thermostatic unit the apices must be slightly rounded or curved. The rounded end regions of the glass rod 34 may be ground or otherwise fashioned to the proper shape.

FIGURES 6 and 7 illustrate a cap means which may be employed at the ends of the glass rod in lieu of shaping the end region of the rod to an accurate configuration. As shown in FIGURES 6 and 7, a cap member 112 formed of sheet metal may be telescoped over the end regions of the rod 34′, each cap member having a cone-shaped portion 114 terminating in a rounded apex 116 of the proper curvature for engagement in the socket 106 in the strut 24 and in the recess 102 in the portion 98. Through the use of the cap members shown in FIGURES 6 and 7, the end regions of the glass rod 34′ need not be fashioned to a critical dimension. It is to be understood that the use of the caps 112 at the end regions of the glass rod does not modify the operation of the thermoresponsive unit.

The portion 98 of member 54 is initially fashioned so that in disassembled condition it would normally extend downwardly at a substantial angle with respect to the portion 54 and is thus pre-stressed in a direction whereby during expansion of the thermo-responsive strut or tubular member 24, it will move downwardly to flex the switch member 52 downwardly and effect a disengagement of the contacts 70 and 72. The member 54 may be made of steel and retains its resiliency due to its pre-stressed condition to assure proper transmission of linear movement of the rod 94 to the switch member 52.

The thermoresponsive strut member 24 is preferably fashioned of aluminum or aluminum alloy but it may be made of stainless steel or other metal having a sufficient thermal differential of expansion and contraction with respect to the glass rod 34 to obtain substantial movement of the switch arm 52 and contact 70 under the influence of variations in temperature adjacent the bar or strut 24.

As shown schematically in FIGURE 1, the current source or supply conductors designated L1 and L2 are connected respectively to one side of the energizing or heating unit 14 and the terminal 62 which establishes current flow through switch member 62 to the contact 72. The unit 14 is connected by a lead or conductor 120 with the terminal 56 which is in contact with the switch member 52. Thus a closing of the contacts 70 and 72 establishes a circuit through the energizing means or heating unit 14 and the action of the thermoresponsive element 24 causes engagement and disengagement of the contacts 70 and 72 to maintain substantially constant the temperature adjacent the element 24 as determined by the setting or adjustment of the manually adjustable member 74.

It is apparent that, within the scope of the invention, modifications and different arrangements may be made other than as herein disclosed, and the present disclosure is illustrative merely, the invention comprehending all variations thereof.

I claim:

1. Switch mechanism including, in combination, a support, a first switch member, a second switch member, cooperating contacts carried by said members, manually operable means for adjusting the position of said first switch member, thermoresponsive means for actuating said second switch member, said thermoresponsive means including a tubular member formed of metal secured to the support, a rod of nonmetallic material extending into the tubular member and having one end engaging an abutment in the tubular member, an element mounted upon said support and having a portion coextensively arranged adjacent said second switch member, the distal end region of said element being adapted for engagement with said second switch member, said element being normally stressed to bias the second switch member in a direction to disengage the contacts, the other end of said rod engaging said element adjacent said support whereby lengthwise movement of the rod under the influence of changes in the effective length of the tubular member due to temperature variations causes an increased movment of the distal end of said element to actuate said second switch member.

2. Switch mechanism including, in combination, a support, a first switch member, a second switch member, cooperating contacts carried by said members, an actuating element for the second switch member anchored to the support and engaging the second switch member, said element being normally stressed to bias the second switch member in a direction to disengage the contacts, thermoresponsive means for actuating said second switch member, said thermoresponsive means including a tubular member formed of aluminum secured to the support, a rigid rod formed of glass extending into the tubular member, one end of the rod engaging an abutment associated with the tubular member, the other end of said rod being arranged to effect movement of the actuating element and the second switch member under the influence of relative changes in the length of said tubular member due to ambient temperature variations.

3. Switch mechanism including, in combination, a support, a first switch member, a second switch member, cooperating contacts carried by said members, manually operable means for adjusting the position of said first switch member, thermoresponsive means for actuating said second switch member, said thermoresponsive means including a tubular member formed of metal secured to the support, a rod of nonmetallic material extending into the tubular member, one end of the rod engaging an abutment in the tubular member, an element mounted on said support having an end region adapted for engagement with the second switch member, said element being normally stressed to bias the second switch member in a direction to disengage the contacts, the other end of the rod engaging the element at a region adjacent the support whereby lengthwise movement of the rod influences the position of said second switch member through said element.

4. Switch mechanism including, in combination, a support, a first switch member, a second switch member, one end region of each said switch members being mounted by the support, cooperating contacts carried by said members, thermoresponsive means for actuating said second switch member, said thermoresponsive means including a tubular member formed of metal secured to the support, a rod of nonmetallic material extending into the tubular member, one end of the rod engaging an abutment in the tubular member, an element having one end region mounted by the support and having a reinforced portion coextensively arranged adjacent the second switch member, the portion of said element joining the reinforced portion with that portion secured to the support being offset providing a region of flexure in said element, said rod engaging the reinforced portion of said element adjacent the offset portion, the distal end region of said element being adapted to engage and actuate said second switch member by lengthwise movement of said rod, said element being normally stressed to bias said second switch member in a direction to disengage the contacts.

5. Switch mechanism including, in combination, a support, a first switch member, a second switch member, one end region of each of said switch members being mounted by the support, cooperating contacts carried by said members, thermoresponsive means for actuating said second switch member, said thermoresponsive means including a tubular member formed of metal secured to the support, a rod of nonmetallic material extending into the tubular member, one end of the rod engaging an abutment in the tubular member, an element having one end region mounted by the support and coextensively arranged adjacent the second switch member, the portion of said element adjacent the support being of weakened cross-section providing a region of flexure for said element, said rod engaging said element adjacent the region of flexure, said element being adapted to engage and actuate said second switch member by lengthwise movement of said rod, said element being normally stressed to bias said second switch member in a direction to disengage the contacts, the distance between the region of flexure and the point of engagement of the element with the second switch member being substantially greater than the distance between the region of flexure and the point of engagement of the rod with the element.

6. Switch mechanism including, in combination, a support, a first switch member, a second switch member, one end region of each of said switch members being mounted by the support cooperating contacts carried by said members, manually operable means for adjusting the position of said first switch member, thermoresponsive means for actuating said second switch member, said thermoresponsive means including a tubular member formed of metal secured to the support, a rod of nonmetallic material extending into the tubular member, one end of the rod engaging an abutment in the tubular member, said first switch member being formed with a region of reduced cross-section adjacent the support to provide a region of flexure for the first switch member, an element having one end region mounted by the support and having a ribbed portion coextensively arranged adjacent the second switch member, the portion of said element joining the ribbed portion with that portion secured to the support being offset and of weakened cross-section providing a region of flexure in said element, said rod engaging the ribbed portion of said element adjacent the offset portion, the distal end region of the ribbed portion being adapted to engage and actuate said second switch member by lengthwise movement of said rod, said element being normally stressed to bias said second switch member in a direction to disengage the contacts, the distance between the offset portion and the point of engagement of the ribbed portion of said element with the second switch member being substantially greater than the distance between the offset portion and the point of engagement of the rod with the ribbed portion.

References Cited in the file of this patent

UNITED STATES PATENTS

| | | |
|---|---|---|
| 1,088,193 | Wentz | Feb. 24, 1914 |
| 1,724,252 | Boker | Aug. 13, 1929 |
| 1,736,979 | Mottlau | Nov. 26, 1929 |
| 2,089,081 | Wemple | Aug. 3, 1937 |
| 2,160,634 | Zurcher | May 30, 1939 |
| 2,314,989 | Kercher | Mar. 30, 1943 |
| 2,496,229 | Parkhurst | Jan. 31, 1950 |
| 2,559,372 | Rike | July 3, 1951 |
| 2,728,068 | Adams | Dec. 20, 1955 |
| 2,769,878 | Krichton | Nov. 6, 1956 |
| 2,814,694 | Moodie | Nov. 26, 1957 |
| 2,851,559 | Rosen | Sept. 9, 1958 |
| 2,856,489 | Bletz | Oct. 14, 1958 |
| 2,911,514 | Haller | Nov. 3, 1959 |

FOREIGN PATENTS

| | | |
|---|---|---|
| 482,002 | Great Britain | Mar. 22, 1938 |
| 715,922 | Great Britain | Sept. 22, 1954 |